US010661625B2

(12) United States Patent
Kurai et al.

(10) Patent No.: US 10,661,625 B2
(45) Date of Patent: May 26, 2020

(54) TRANSPORT VEHICLE

(71) Applicant: HONDA MOTOR CO., LTD., Minato-ku, Tokyo (JP)

(72) Inventors: Kenichiro Kurai, Tochigi-ken (JP); Takuya Mori, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 16/111,256

(22) Filed: Aug. 24, 2018

(65) Prior Publication Data
US 2019/0061456 A1    Feb. 28, 2019

(30) Foreign Application Priority Data

Aug. 29, 2017    (JP) .................. 2017-164363

(51) Int. Cl.
| | | |
|---|---|---|
| *B60P 9/00* | (2006.01) | |
| *B60G 11/14* | (2006.01) | |
| *B62D 53/02* | (2006.01) | |
| *B60D 1/62* | (2006.01) | |
| *B60D 1/02* | (2006.01) | |
| *B60D 1/00* | (2006.01) | |

(52) U.S. Cl.
CPC .............. *B60G 11/14* (2013.01); *B60D 1/02* (2013.01); *B60D 1/62* (2013.01); *B60P 9/00* (2013.01); *B62D 53/021* (2013.01); *B60D 2001/005* (2013.01); *B60G 2300/02* (2013.01); *G05D 2201/0216* (2013.01)

(58) Field of Classification Search
CPC ........... B25B 11/00; B25B 5/08; B25B 13/18; B25B 13/24; B25B 13/22; B25B 13/32; B60P 7/0892; B60P 7/03; B23Q 3/062; B23Q 3/06; B61G 1/06; B61G 1/14
USPC ............... 269/246, 156, 291, 111, 113, 119
See application file for complete search history.

(56) References Cited

U.S. PATENT DOCUMENTS

| | | | | |
|---|---|---|---|---|
| 4,157,820 A | * | 6/1979 | Meuschel | B23Q 3/062 269/319 |
| 5,107,577 A | * | 4/1992 | Jackson | B23Q 1/4866 29/281.4 |
| 6,276,038 B1 | * | 8/2001 | Boochakorn | B25B 5/08 29/281.5 |

(Continued)

FOREIGN PATENT DOCUMENTS

| | | |
|---|---|---|
| JP | 4561004 | 1/2003 |
| JP | 4264824 | 10/2005 |

(Continued)

OTHER PUBLICATIONS

Japanese Office Action for Japanese Patent Application No. 2017-164363 dated Dec. 4, 2018.

*Primary Examiner* — Kaitlin S Joerger
(74) *Attorney, Agent, or Firm* — Amin, Turocy & Watson, LLP

(57) ABSTRACT

In an autonomous traveling unit, a toggle mechanism including a plurality of sliders is provided. In the plurality of sliders, cam followers are provided, respectively. Meanwhile, in a workpiece loading unit, a clamped portion is provided. As a result of the cam followers, which are displaced so as to separate away from each other, entering intersection portions of the clamped portion, the workpiece loading unit is restrained by the autonomous traveling unit.

6 Claims, 5 Drawing Sheets

(56) References Cited

U.S. PATENT DOCUMENTS

| | | | | |
|---|---|---|---|---|
| 6,889,413 | B2* | 5/2005 | Bendler | B25B 1/08 |
| | | | | 269/254 CS |
| 9,333,610 | B2* | 5/2016 | Akagawa | B23Q 16/004 |
| 10,213,841 | B2* | 2/2019 | Steger | A61C 13/0006 |
| 2016/0265710 | A1* | 9/2016 | McClelland | B60P 7/0892 |
| 2017/0334332 | A1* | 11/2017 | Iotti | B60P 7/0807 |
| 2019/0023174 | A1 | 1/2019 | Kurai et al. | |
| 2019/0061456 | A1* | 2/2019 | Kurai | B60D 1/02 |

FOREIGN PATENT DOCUMENTS

| | | |
|---|---|---|
| JP | 5448058 | 3/2011 |
| JP | 2019-018696 | 2/2019 |

\* cited by examiner

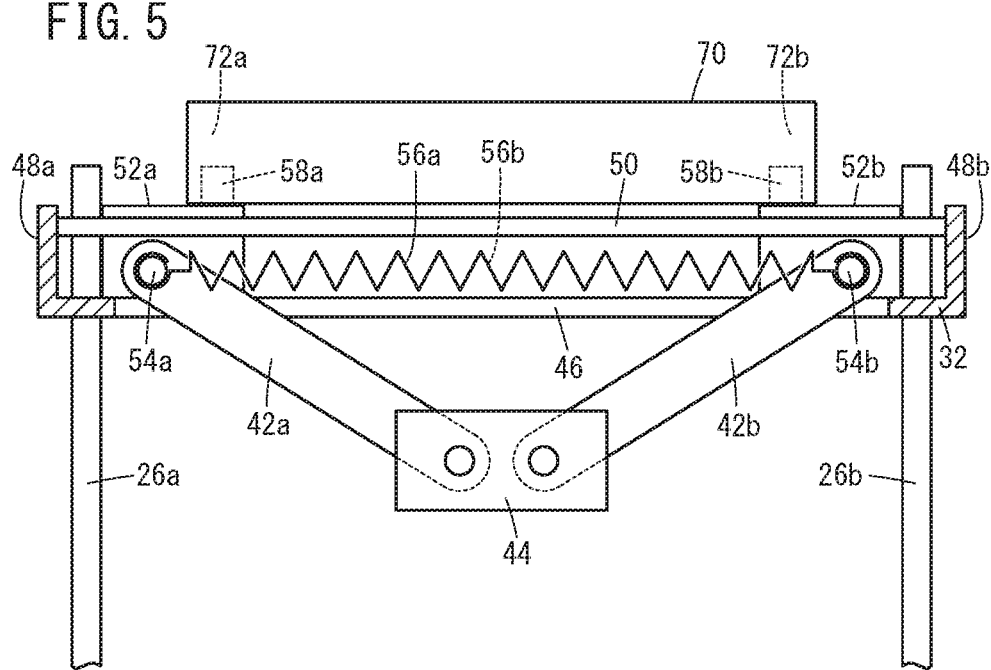

TRANSPORT VEHICLE

CROSS-REFERENCE TO RELATED APPLICATION

This application is based upon and claims the benefit of priority from Japanese Patent Application No. 2017-164363 filed on Aug. 29, 2017, the contents of which are incorporated herein by reference.

BACKGROUND OF THE INVENTION

Field of the Invention

The present invention relates to a transport vehicle provided with an autonomous traveling unit and a workpiece loading unit that is detachably supported on an upper part of the autonomous traveling unit and can carry a workpiece.

Description of the Related Art

An automated guided vehicle (AGV) is widely used as a transporting means that automatically transports goods (workpieces) in a factory or the like. As AGVs of this kind, a towing AGV, like those described in Japanese Patent No. 5448058 and Japanese Patent No. 4561004, which couples a workpiece loading unit before or after an autonomous traveling unit and a low-floor AGV, like that described in Japanese Patent No. 4264824, which has a workpiece loading unit provided on an upper part of a transport vehicle portion are well-known.

In a commonly used low-floor AGV, after an autonomous traveling unit enters under a workpiece loading unit, the workpiece loading unit is moved upward by a predetermined up-and-down movement mechanism provided in the autonomous traveling unit. On the other hand, in Japanese Patent No. 4264824, a structure is proposed, in which the autonomous traveling unit and the workpiece loading unit are coupled together by engaging a pin provided in the autonomous traveling unit in an engagement hole formed on the workpiece loading unit.

SUMMARY OF THE INVENTION

In a towing AGV, an autonomous traveling unit and a workpiece loading unit are connected with one of them being located before or after the other. As a result, a large movement space is necessary. Moreover, if a malfunction occurs in a wheel of the autonomous traveling unit, the workpiece loading unit has to be towed in a state in which the workpiece loading unit is inclined relative to the autonomous traveling unit. Given that such a situation occurs, it is necessary to provide a margin or place a guide on a side (or sides) of a travelling space. In addition, in this case, since the workpiece loading unit shakes comparatively-freely relative to the autonomous traveling unit, positioning of the workpiece loading unit and the autonomous traveling unit is undesirably difficult. Furthermore, it is difficult for the AGV to move backward and it is impossible for the AGV to move sideward. That is, the direction of movement is practically restricted to a forward direction.

Meanwhile, the structure described in Japanese Patent No. 4264824 makes it necessary to increase a pin diameter so as to deal with a weight load of the workpiece loading unit and the workpiece. Moreover, the diameter of the engagement hole which is formed in the workpiece loading unit has to be increased to tolerate a relative position gap between the autonomous traveling unit and the workpiece loading unit. Since the workpiece loading unit carries the workpiece, it is necessary to increase the size of the workpiece loading unit in order to ensure rigidity even when the diameter of the engagement hole is increased. Since the number of workpiece loading units is generally greater than the number of autonomous traveling units, preparing a lot of large workpiece loading units results in an increase in costs.

A main object of the present invention is to provide a transport vehicle that allows positioning and coupling of an autonomous traveling unit and a workpiece loading unit to be easily performed.

Another object of the present invention is to provide the transport vehicle that can make the workpiece loading unit compact.

An embodiment of the present invention provides a transport vehicle provided with an autonomous traveling unit and a workpiece loading unit that is detachably supported on an upper part of the autonomous traveling unit. The transport vehicle includes: a toggle mechanism provided in the autonomous traveling unit and including a plurality of sliders configured to be displaced in synchronization with each other; cam followers each provided in the plurality of sliders; and a clamped portion provided in the workpiece loading unit, the cam followers configured to enter the clamped portion. The clamped portion includes two intersection portions, each being formed as a result of two sides intersecting at a predetermined angle, the workpiece loading unit is configured to be restrained by the autonomous traveling unit as a result of the cam followers entering the two intersection portions, respectively, and making contact with the clamped portion, and the workpiece loading unit is configured to be released from restraint by the autonomous traveling unit as a result of the cam followers separating from the two intersection portions.

First, in the present invention, positioning and coupling of the autonomous traveling unit and the workpiece loading unit are performed by the cam followers, which are provided in the sliders constituting the toggle mechanism, and the clamped portion. That is, positioning and coupling by a pin and an engagement hole are not performed. Thus, there is no need to form an engagement hole in the workpiece loading unit, which inevitably eliminates the need to make the workpiece loading unit as a large portion to ensure the rigidity of the workpiece loading unit.

For the above-described reason, the structure of the transport vehicle, in particular, the structure of the autonomous traveling unit is simplified and it is possible to make the workpiece loading unit compact. This makes it possible to achieve a reduction in costs.

Furthermore, by displacing the sliders so that the sliders approach toward the vertices of the clamped portion, the cam followers press the clamped portion, whereby positioning and coupling are performed. As described above, the present invention makes it easy to perform positioning and coupling of the autonomous traveling unit and the workpiece loading unit.

In addition, even when there are position gaps between the cam followers and the clamped portion, as a result of the thrust of the sliders acting on the clamped portion, the clamped portion is pressed against the sides where the cam followers are located. As a result, the positions of the clamped portion and the cam followers coincide with each other with high accuracy. Thus, no problem arises even if initial positioning of the cam followers and the clamped portion is not performed so precisely. That is, the above-described structure increases tolerance for position gaps and improves positioning accuracy.

Furthermore, when the above-described positioning is performed, the movement of the autonomous traveling unit or the workpiece loading unit is small. This makes it possible to reduce loss of energy such as electric power required for positioning.

In addition, it is possible to couple the autonomous traveling unit and the workpiece loading unit by a strong clamping force which is generated by the toggle mechanism and improve responsiveness to movement. Furthermore, the toggle mechanism eliminates the need for energy to keep coupling, which makes it possible to achieve energy conservation and a reduction in running costs.

Moreover, in the present invention, the autonomous traveling unit does not tow the workpiece loading unit. Thus, a movement space is not increased and there is no need for a margin even when a malfunction occurs in the autonomous traveling unit. This makes it possible to save space in a factory, a storage warehouse, or the like in which the transport vehicle is used. In addition, the direction of movement is not restricted to a forward direction.

The toggle mechanism may include, for example, an up-and-down moving member configured to move upward and downward, and toggle arms, each including one end coupled to the up-and-down moving member. In this case, each of the sliders may be coupled to another end of a corresponding one of the toggle arms.

Preferred examples of the clamped portion include a frame in the shape of a quadrilateral. In this case, for example, by cutting rectangular column-shaped pipes and joining them together, it is possible to fabricate the clamped portion easily.

According to the present invention, by using the cam followers provided in the sliders constituting the toggle mechanism provided in the autonomous traveling unit and the clamped portion provided in the workpiece loading unit, positioning and coupling of the autonomous traveling unit and the workpiece loading unit are performed. Thus, the structure of the transport vehicle, in particular, the structure of the autonomous traveling unit is simplified and it is possible to make the workpiece loading unit compact. This makes it possible to achieve a reduction in costs. Moreover, tolerance for position gaps between the cam followers and the clamped portion is increased and positioning accuracy is improved.

Furthermore, the above-described structure makes it easy to perform positioning and coupling of the autonomous traveling unit and the workpiece loading unit. In addition, when positioning and coupling are performed, since the movement of the autonomous traveling unit or the workpiece loading unit is small, it is possible to reduce loss of energy such as electric power required for positioning.

Moreover, it is possible to couple the autonomous traveling unit and the workpiece loading unit by a strong clamping force which is generated by the toggle mechanism, and improve responsiveness to movement. Furthermore, by adopting the toggle mechanism, it is possible to achieve energy conservation and a reduction in running costs.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is an enlarged side view of principal portions, which depicts a state in which the clamp mechanism has continuously moved upward from the state depicted in FIG. 3, a toggle mechanism has operated, and a first slider and a second slider have got away from each other.

DESCRIPTION OF THE PREFERRED EMBODIMENTS

Hereinafter, a preferred embodiment of a transport vehicle according to the present invention will be described in detail with reference to the accompanying drawings.

Figure 1:
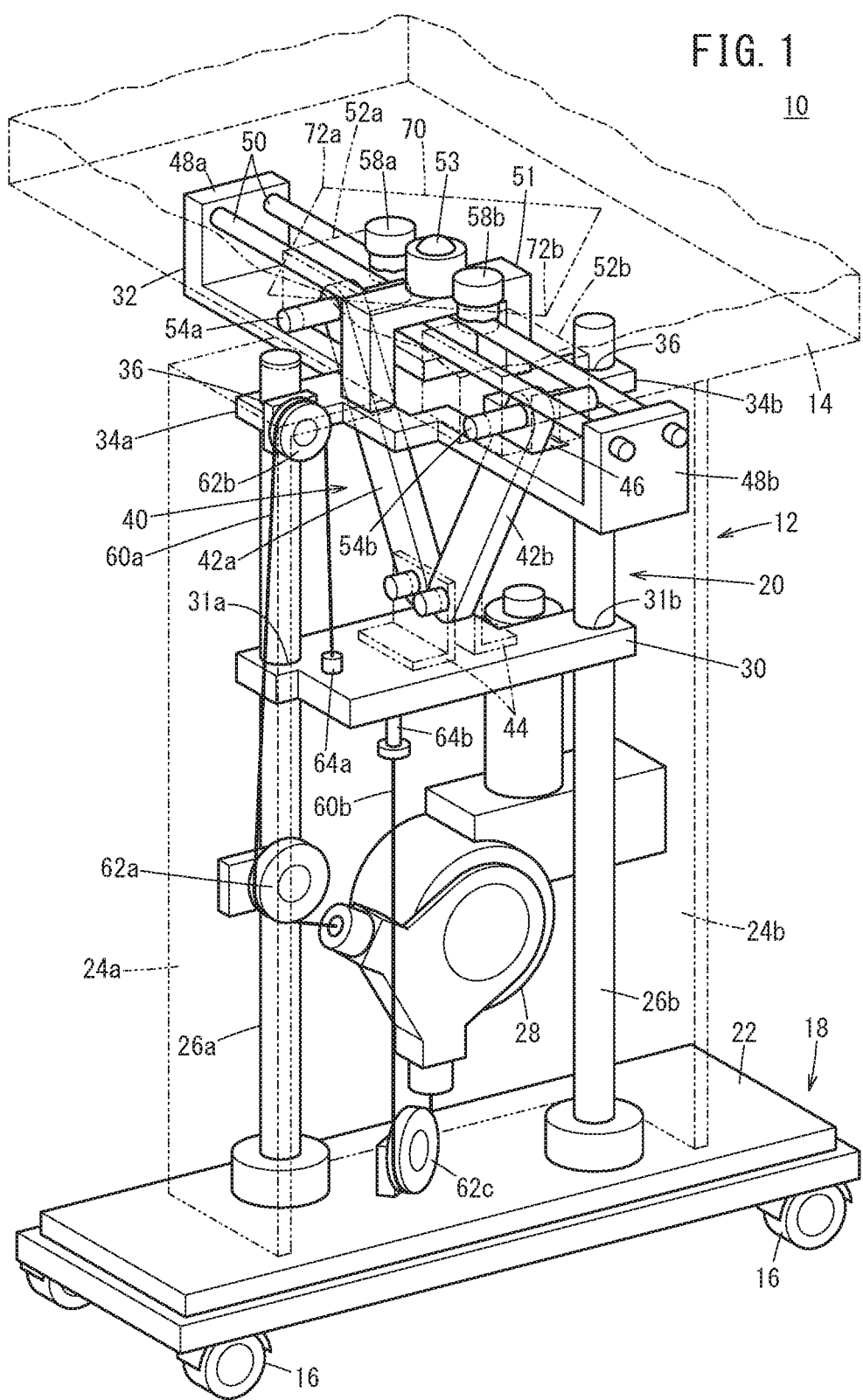
FIG. 1 is a schematic perspective view of principal portions of a transport vehicle according to an embodiment of the present invention.

FIG. 1 is a schematic perspective view of principal portions of a transport vehicle 10 according to the present embodiment. This transport vehicle 10 is provided with an autonomous traveling unit 12 and a workpiece loading unit 14 that is disposed on an upper part of the autonomous traveling unit 12 and coupled to the autonomous traveling unit 12. That is, the transport vehicle 10 is a so-called AGV.

The autonomous traveling unit 12 has a base 18 including wheels 16 and a clamp mechanism 20 provided on the base 18. The clamp mechanism 20 is supported on the base 18 via a supporting board 22.

On the supporting board 22, a first supporting post 24a and a second supporting post 24b, each having a substantially L-shaped horizontal cross-section, are provided so as to stand, and an up-and-down movement first guide bar 26a and an up-and-down movement second guide bar 26b are supported by the first supporting post 24a and the second supporting post 24b, respectively. A direction in which the up-and-down movement first guide bar 26a and the up-and-down movement second guide bar 26b extend is a vertical direction as in the case of the first supporting post 24a and the second supporting post 24b.

On the second supporting post 24b, a drive motor 28 as a drive mechanism is supported. Moreover, on the up-and-down movement first guide bar 26a and the up-and-down movement second guide bar 26b, an up-and-down moving board 30 (an up-and-down moving member) is supported in a displaceable manner. That is, in the up-and-down moving board 30, two insertion holes 31a, 31b are formed, and the up-and-down movement first guide bar 26a and the up-and-down movement second guide bar 26b are inserted into these insertion holes 31a, 31b, respectively.

Figure 2:
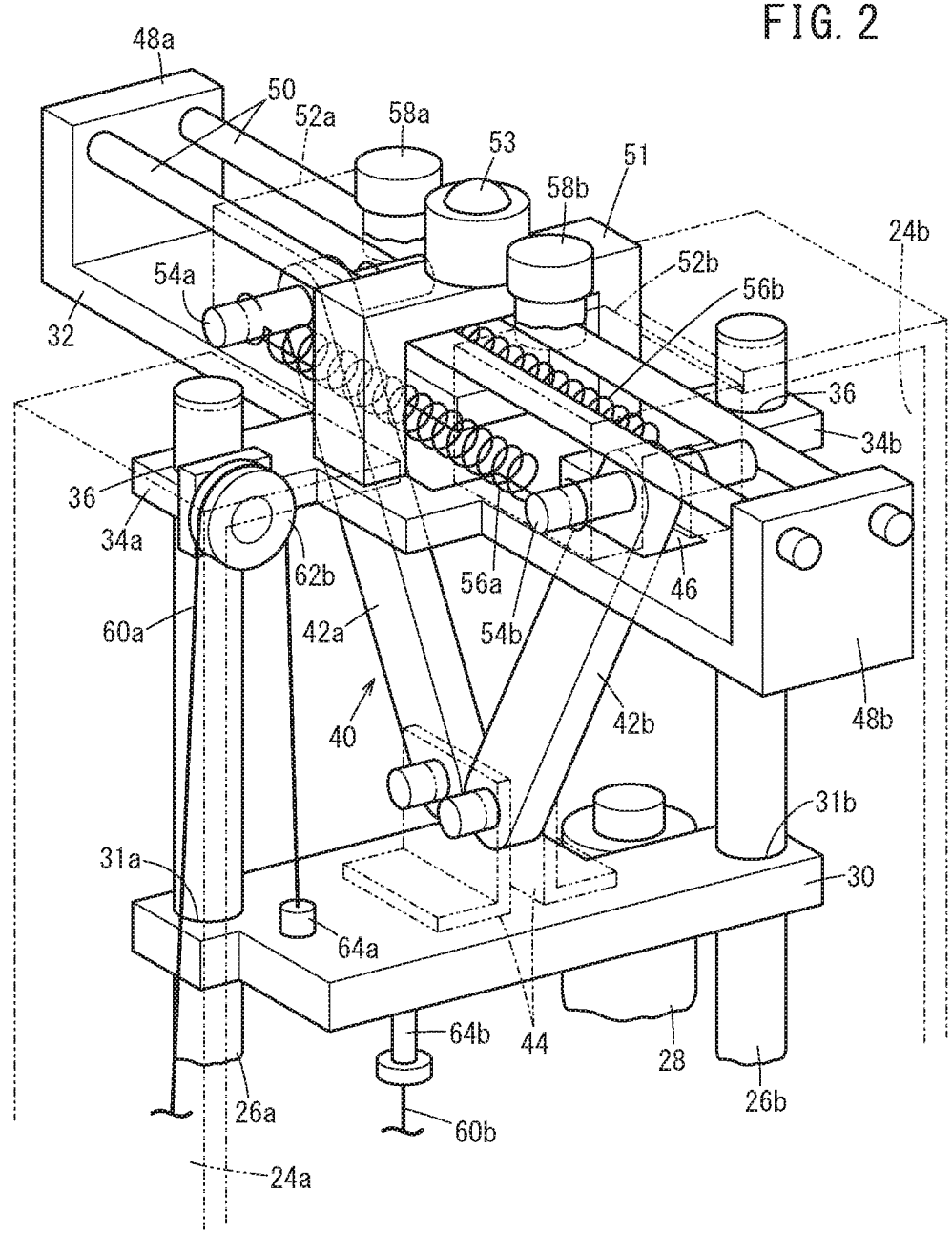
FIG. 2 is an enlarged perspective view of principal portions of an autonomous traveling unit depicted in FIG. 1.

In the up-and-down movement first guide bar 26a and the up-and-down movement second guide bar 26b, a sliding board 32 is provided in such a way that the sliding board 32 can move upward and downward. As depicted in detail in FIG. 2, in the sliding board 32, two tab portions 34a, 34b are formed so as to protrude therefrom, and, in each of these tab portions 34a, 34b, a bar insertion hole 36 is formed. The up-and-down movement first guide bar 26a and the up-and-down movement second guide bar 26b are placed through these bar insertion holes 36.

To the up-and-down moving board 30, a first toggle arm 42a and a second toggle arm 42b, which constitute a toggle mechanism 40, are coupled via a link member 44. The first toggle arm 42a and the second toggle arm 42b extend so as to be inclined at a predetermined angle relative to a vertical direction and are placed through a long slit 46 formed in the sliding board 32.

At the longitudinal ends of the sliding board 32, bar supporting boards 48a, 48b in the shape of a flat plate are provided so as to stand. A pair of sliding guide bars 50 is laid between the bar supporting boards 48a, 48b. At about the midpoint of the sliding board 32 in the longitudinal direction thereof, a gate member 51 substantially in the shape of an inverted letter U is positioned and fixed, and the sliding guide bars 50 pass through the gate member 51. In the gate member 51, a ball portion 53 is provided.

On the sliding board 32, a first slider 52a and a second slider 52b, which are shown by the virtual lines, slide. The first slider 52a and the second slider 52b are coupled to the first toggle arm 42a and the second toggle arm 42b via a first coupling shaft 54a and a second coupling shaft 54b, respectively. Moreover, in the first slider 52a and the second slider 52b, unillustrated guide holes are formed, and the sliding guide bars 50 are placed through the guide holes.

Hook portions provided at the ends of a first coil spring 56a and a second coil spring 56b (both of which are pulling units) engage or are hooked on the first coupling shaft 54a and the second coupling shaft 54b. By the tension of these first coil spring 56a and second coil spring 56b, the first slider 52a and the second slider 52b are pulled in directions in which the first slider 52a and the second slider 52b approach toward each other. Alternatively, shafts extending parallel to the first coupling shaft 54a and the second coupling shaft 54b may be provided inside the first slider 52a and the second slider 52b, respectively, and one coil spring may be hooked on these two shafts.

Moreover, on the upper end faces of the first slider 52a and the second slider 52b, a first cam follower 58a and a second cam follower 58b are respectively provided. The first cam follower 58a and the second cam follower 58b are located in the positions in which the first cam follower 58a and the second cam follower 58b face each other with the gate member 51 placed therebetween.

The drive motor 28 has a first wire 60a and a second wire 60b. The first wire 60a is stretched over a first pulley 62a, which is provided slightly below an intermediate part of the first supporting post 24a in the longitudinal direction thereof, and a second pulley 62b provided at the upper end of the first supporting post 24a, and then hooked on (or attached to) a first wire hook portion 64a formed on the upper end face of the up-and-down moving board 30. On the other hand, the second wire 60b extends downward toward the supporting board 22, is then stretched over a third pulley 62c provided in the supporting board 22, extends upward toward the up-and-down moving board 30, and is then hooked on (or attached to) a second wire hook portion 64b provided on the lower end face of the up-and-down moving board 30.

The autonomous traveling unit 12 structured as described above autonomously travels by, for example, appropriate guiding means such as magnetism and signals.

The workpiece loading unit 14 carries unillustrated goods (workpieces), and a clamped portion 70 is provided on the bottom thereof. The clamped portion 70 is formed in the shape of a square as a result of, for example, one or a plurality of square pipes being bent as necessary and appropriately joined together. That is, the clamped portion 70 is formed as a frame having four vertices and four sides which are substantially equal in length. Hereinafter, for the purpose of illustration, a vertex (an intersection portion) facing the first cam follower 58a is written as a first vertex 72a and a vertex (an intersection portion) facing the second cam follower 58b is written as a second vertex 72b.

The transport vehicle 10 according to the present embodiment is basically structured as described above, and the operation and effects thereof will be described below.

When a workpiece is transported by using the transport vehicle 10, first, an operator loads a workpiece onto the workpiece loading unit 14. Next, the autonomous traveling unit 12 enters under the workpiece loading unit 14, and a state shown in FIG. 1 is obtained. At this time, the first slider 52a and the second slider 52b are located in the positions in which they are closest to each other and the toggle mechanism 40 does not clamp the clamped portion 70. In other words, the workpiece loading unit 14 is not restrained by the autonomous traveling unit 12.

Figure 3:
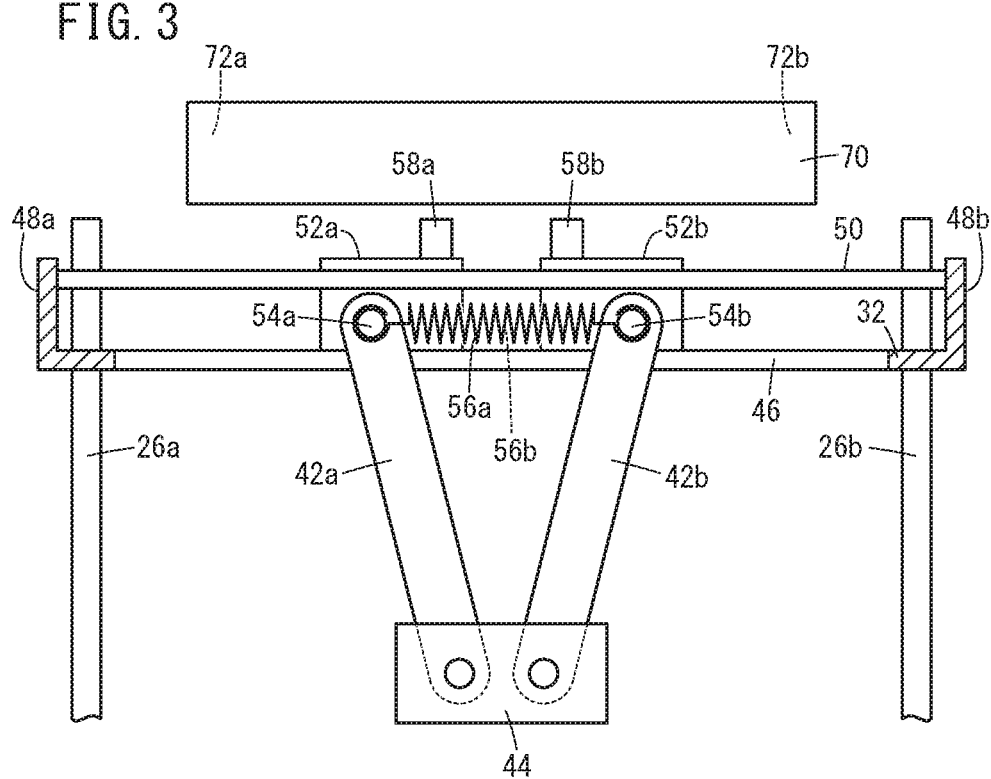
FIG. 3 is an enlarged side view of principal portions, which depicts a state in which a clamp mechanism constituting the transport vehicle of FIG. 1 has moved upward.

Next, the drive motor 28 is energized. This causes the first wire 60a to be reeled in by the drive motor 28 and the second wire 60b to be reeled out from the drive motor 28. As a result, as depicted in FIG. 3, the up-and-down moving board 30 and the sliding board 32 (the clamp mechanism 20) move upward. At this time, the up-and-down moving board 30 and the sliding board 32 are guided by the up-and-down movement first guide bar 26a and the up-and-down movement second guide bar 26b.

At this point in time, the tension of the first coil spring 56a and the second coil spring 56b keeps the first slider 52a and the second slider 52b in the positions in which they are closest to each other. That is, the first slider 52a and the second slider 52b are not displaced and the first toggle arm 42a and the second toggle arm 42b do not pivot.

With the upward movement of the up-and-down moving board 30 and the sliding board 32, the first slider 52a and the second slider 52b come into contact with the clamped portion 70 and the ball portion 53 comes into contact with the bottom face of the workpiece loading unit 14. As a result, the upward movement of the sliding board 32 is stopped.

On the other hand, the up-and-down moving board 30 moves further upward. With this upward movement, the first toggle arm 42a and the second toggle arm 42b coupled together via the link member 44 pivot about the link member 44 as a pivot center in such a way as to separate away from each other against the tension of the first coil spring 56a and the second coil spring 56b. The first slider 52a and the second slider 52b which are coupled to the first toggle arm 42a and the second toggle arm 42b via the first coupling shaft 54a and the second coupling shaft 54b, respectively, follow this and slide on the sliding board 32 in directions in which the first slider 52a and the second slider 52b separate away from each other. At this time, the first slider 52a and the second slider 52b are guided by the sliding guide bars 50.

Figure 4:
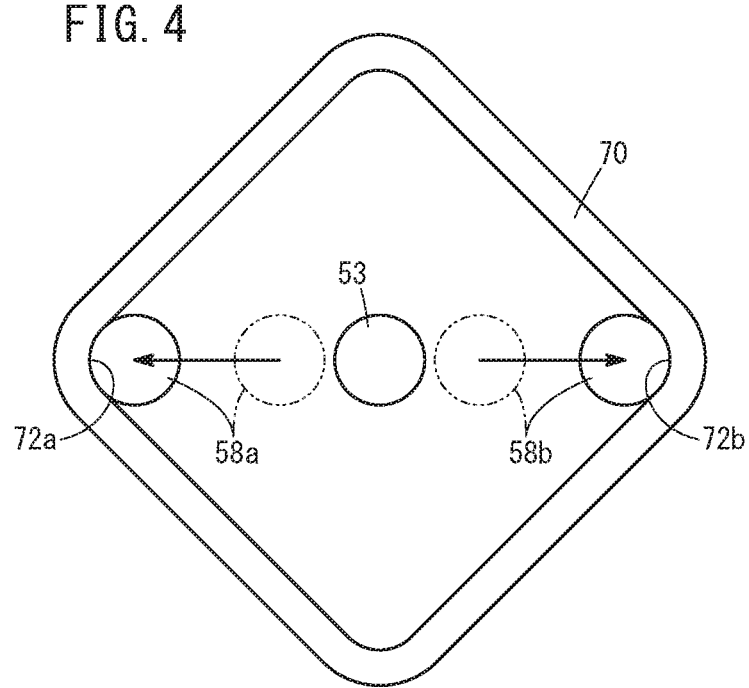
FIG. 4 is a schematic plan view of principal portions, which schematically depicts a state in which a first cam follower and a second cam follower have moved toward the vertices of a clamped portion.

As a result, as depicted in FIGS. 4 and 5, the first cam follower 58a is displaced toward the first vertex 72a, and the second cam follower 58b is displaced toward the second vertex 72b, respectively. If there are position gaps between the first cam follower 58a and the first vertex 72a and between the second cam follower 58b and the second vertex 72b (or they are not properly positioned), the first cam follower 58a and the second cam follower 58b each make contact with a certain side of the clamped portion 70.

When the first slider 52a and the second slider 52b move further backward in this state in such a way as to separate away from each other, the first cam follower 58a and the second cam follower 58b press the clamped portion 70. By this pressing force, the position of the workpiece loading unit 14 is changed, whereby positioning of the autonomous traveling unit 12 and the workpiece loading unit 14 is performed. Thus, as shown by the solid lines in FIG. 4, the first cam follower 58a reaches the first vertex 72a and the second cam follower 58b reaches the second vertex 72b. At this time, the whole of the first toggle arm 42a and the whole of the second toggle arm 42b pass through the slit 46 and are located between the bottom of the sliding board 32 and the sliding guide bars 50.

As a result, by the thrust of the first slider 52a and the second slider 52b, the first cam follower 58a and the second cam follower 58b press the clamped portion 70 outward. By being pressed in this way, the clamped portion 70 is firmly clamped by the first cam follower 58a and the second cam follower 58b. That is, the workpiece loading unit 14 is restrained by the autonomous traveling unit 12. In other words, the workpiece loading unit 14 is coupled to the autonomous traveling unit 12, which completes the structure of the transport vehicle 10.

As described above, in the present embodiment, the clamped portion 70 has a cam structure and the first cam follower 58a and the second cam follower 58b press the clamped portion 70. This makes it easy to perform positioning and coupling of the autonomous traveling unit 12 and the workpiece loading unit 14. In addition thereto, positioning accuracy is improved.

Moreover, when positioning or coupling is performed, the relative movement of the autonomous traveling unit 12 or the workpiece loading unit 14 is small. This makes it possible to reduce loss of energy such as electric power required for positioning or coupling.

The autonomous traveling unit 12 autonomously travels in this state. That is, the workpiece is transported to a predetermined destination by the autonomous traveling unit 12 together with the workpiece loading unit 14. While the workpiece is being transported, the autonomous traveling unit 12 and the workpiece loading unit 14 are firmly coupled together by a strong clamping force via the toggle mechanism 40, which makes it possible to improve responsiveness to movement. Moreover, the toggle mechanism 40 eliminates the need for energy to keep coupling between the autonomous traveling unit 12 and the workpiece loading unit 14 (the clamped state of the clamped portion 70 by the first cam follower 58a and the second cam follower 58b). This also makes it possible to achieve energy conservation and a reduction in running costs.

Then, the workpiece is unloaded and the workpiece loading unit 14 is released from the autonomous traveling unit 12. At this time, the drive motor 28 is energized, and in a manner opposite to that described above, the first wire 60a is reeled out from the drive motor 28 and the second wire 60b is reeled in by the drive motor 28. As a result, the up-and-down moving board 30 moves downward by being guided by the up-and-down movement first guide bar 26a and the up-and-down movement second guide bar 26b.

When the up-and-down moving board 30 moves downward, the first toggle arm 42a and the second toggle arm 42b coupled together via the link member 44 pivot about the link member 44 as a pivot center in such a way as to approach toward each other. Thus, the first slider 52a and the second slider 52b slide on the sliding board 32 by being guided by the sliding guide bars 50 and approach toward each other. At the same time, the first coil spring 56a and the second coil spring 56b are compressed.

As a result, the first cam follower 58a and the second cam follower 58b move away from the first vertex 72a and the second vertex 72b, respectively, and move forward to the positions in which the first cam follower 58a and the second cam follower 58b are closest to each other. Thus, the clamped portion 70 is released from the restraint by the first cam follower 58a and the second cam follower 58b and the workpiece loading unit 14 can move away from the autonomous traveling unit 12.

As described above, according to the present embodiment, there is no need to perform positioning of the autonomous traveling unit 12 and the workpiece loading unit 14 by using a pin and an engagement hole. This eliminates the need to make the workpiece loading unit 14 as a large portion to ensure the rigidity of the workpiece loading unit 14. Thus, even when a large number of workpiece loading units 14 are prepared, it is possible to avoid an increase in costs.

Furthermore, the clamped portion 70 is obtained by bending square pipes into a rectangular shape (the shape of a frame) and then joining them together. That is, it is possible to fabricate the clamped portion 70 easily. In addition, the square pipe is inexpensive, which contributes to a reduction in costs.

Moreover, in the present embodiment, the autonomous traveling unit 12 does not tow the workpiece loading unit 14. This eliminates the need for a margin to deal with a malfunction which may occur in the wheel 16 of the autonomous traveling unit 12, and there is no possibility of an increase in a movement space. That is, it is possible to save space in a factory, a storage warehouse, or the like in which the transport vehicle 10 is used. In addition, the present embodiment also has the advantage that the direction of movement is not restricted to a forward direction.

The present invention is not limited to the above-described embodiment and various changes and modifications can be made thereto within the scope of the present invention.

For instance, additional cam followers and an additional toggle mechanism for displacing sliders in which the above cam followers are provided may be provided, such that the cam followers may enter the other two vertices other than the first vertex 72a and the second vertex 72b.

Moreover, the clamped portion 70 does not necessarily have to be formed in the shape of a square; for example, two rectangular column members, each being bent 90° and forming substantially the shape of the letter V (or each being formed of two rectangular column members which are joined together so that a crossing angle becomes 90° and form substantially the shape of the letter V), may be provided so as to be separated from each other.

What is claimed is:

1. A transport vehicle provided with an autonomous traveling unit and a workpiece loading unit that is detachably supported on an upper part of the autonomous traveling unit, the transport vehicle comprising:
a toggle mechanism provided in the autonomous traveling unit, and including a plurality of sliders configured to be displaced in synchronization with each other;
cam followers each provided in the plurality of sliders; and
a clamped portion provided in the workpiece loading unit, the cam followers configured to enter the clamped portion, wherein the clamped portion includes two intersection portions, each being formed as a result of two sides intersecting at a predetermined angle, the workpiece loading unit is configured to be restrained by the autonomous traveling unit as a result of the cam followers entering the two intersection portions, respectively, and making contact with the clamped portion, and the workpiece loading unit is configured to be released from restraint by the autonomous traveling unit as a result of the cam followers separating from the two intersection portions.

2. The transport vehicle according to claim 1, wherein the toggle mechanism includes an up-and-down moving member configured to move upward and downward, and toggle arms each including one end coupled to the up-and-down moving member, and each of the plurality of sliders is coupled to another end of a corresponding one of the toggle arms.

3. The transport vehicle according to claim 2, wherein when the up-and-down moving member moves upward, the plurality of sliders are configured to separate away from each other and enter the two intersection portions, and, when the up-and-down moving member moves downward, the plurality of sliders are configured to approach toward each other and move away from the two intersection portions.

4. The transport vehicle according to claim 2, further comprising:

a drive mechanism configured to drive the up-and-down moving member in a direction in which the up-and-down moving member moves upward or downward; and a wire stretched from the drive mechanism to the up-and-down moving member.

5. The transport vehicle according to claim 1, wherein a pulling unit is provided and configured to pull the plurality of sliders in directions in which the plurality of sliders approach toward each other.

6. The transport vehicle according to claim 1, wherein the clamped portion is formed as a frame in a shape of a quadrilateral.

* * * * *